United States Patent
Crupi et al.

(10) Patent No.: US 9,965,514 B2
(45) Date of Patent: May 8, 2018

(54) TECHNIQUES FOR REAL-TIME GENERATION OF TEMPORAL COMPARATIVE AND SUPERLATIVE ANALYTICS IN NATURAL LANGUAGE FOR REAL-TIME DYNAMIC DATA ANALYTICS

(71) Applicant: Software AG USA, Inc., Reston, VA (US)

(72) Inventors: John Crupi, Bethesda, MD (US); Karthic Thope, Fairfax, VA (US)

(73) Assignee: SOFTWARE AG USA, INC., Reston, VA (US)

( * ) Notice: Subject to any disclaimer, the term of this patent is extended or adjusted under 35 U.S.C. 154(b) by 417 days.

(21) Appl. No.: 14/576,413

(22) Filed: Dec. 19, 2014

(65) Prior Publication Data

US 2016/0179922 A1  Jun. 23, 2016

(51) Int. Cl.
G06F 17/30 (2006.01)

(52) U.S. Cl.
CPC .. *G06F 17/30477* (2013.01); *G06F 17/30401* (2013.01)

(58) Field of Classification Search
CPC combination set(s) only.
See application file for complete search history.

(56) References Cited

U.S. PATENT DOCUMENTS

| | | | |
|---|---|---|---|
| 6,584,470 B2 | 6/2003 | Veale | |
| 7,197,460 B1 | 3/2007 | Gupta et al. | |
| 7,209,876 B2 | 4/2007 | Miller et al. | |
| 7,275,024 B2 | 9/2007 | Yeh et al. | |
| 7,720,867 B2* | 5/2010 | Subramanian | G06F 17/30398 707/769 |
| 8,266,351 B2 | 9/2012 | Schöning et al. | |
| 8,301,438 B2 | 10/2012 | Ferrucci et al. | |
| 8,538,744 B2 | 9/2013 | Roberts et al. | |
| 8,640,089 B2 | 1/2014 | Bates et al. | |
| 8,645,122 B1 | 2/2014 | Di Fabbrizio et al. | |
| 8,682,647 B1 | 3/2014 | Lee | |
| 8,732,213 B2 | 5/2014 | Sowell et al. | |
| 8,803,884 B2 | 8/2014 | Bradshaw et al. | |
| 8,832,674 B2 | 9/2014 | Harris et al. | |
| 2004/0093200 A1* | 5/2004 | Scott | G06F 17/277 704/9 |
| 2008/0168375 A1* | 7/2008 | Papadimitriou | G06F 17/30241 715/772 |

(Continued)

*Primary Examiner* — Etienne Leroux
(74) *Attorney, Agent, or Firm* — Nixon & Vanderhye PC

(57) ABSTRACT

Certain example embodiments relate to techniques for real-time generation of temporal comparative and superlative analytics. For instance, certain example embodiments analyze real-time events to generate building blocks that are assemblable into natural language question templates. These natural language question templates, which may include natural language phrases and templated fields, may be comparative or superlative in nature. User selectable options or parameters may be inserted in place of the templated fields, and complete questions, including user selections and the comparative or superlative, may be translated into a formal query language for execution on the real-time data source. In certain example embodiments, a GUI may enable users to build pre-constructed questions with selectable parameters.

25 Claims, 9 Drawing Sheets

(56) References Cited

U.S. PATENT DOCUMENTS

| | | | |
|---|---|---|---|
| 2010/0114927 A1* | 5/2010 | Becker | G06F 17/30401 |
| | | | 707/759 |
| 2013/0046725 A1 | 2/2013 | Cammert et al. | |
| 2013/0066866 A1* | 3/2013 | Chan | G06F 17/30551 |
| | | | 707/732 |
| 2013/0066886 A1* | 3/2013 | Bagchi | G06F 17/30654 |
| | | | 707/749 |
| 2014/0025700 A1 | 1/2014 | Schöning | |
| 2014/0078163 A1 | 3/2014 | Cammert et al. | |

* cited by examiner

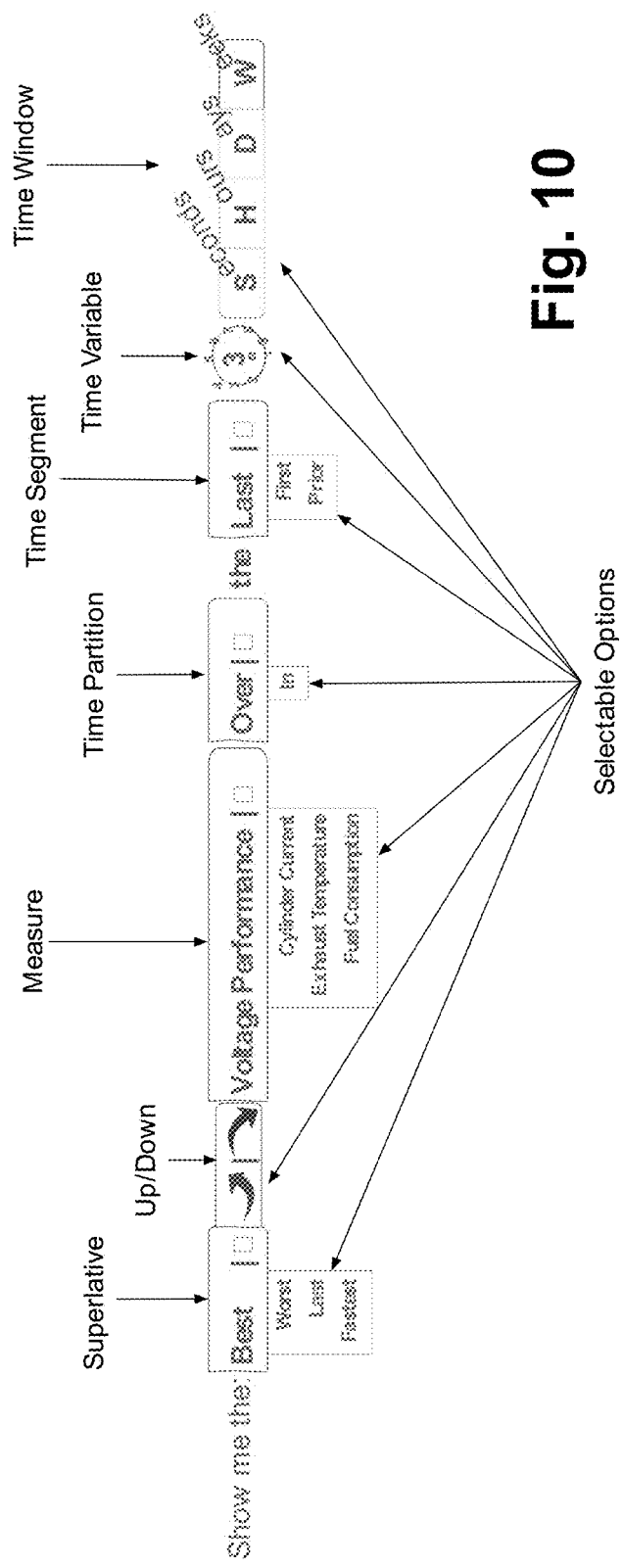

TECHNIQUES FOR REAL-TIME GENERATION OF TEMPORAL COMPARATIVE AND SUPERLATIVE ANALYTICS IN NATURAL LANGUAGE FOR REAL-TIME DYNAMIC DATA ANALYTICS

TECHNICAL FIELD

Certain example embodiments described herein relate to systems and/or methods for real-time generation of temporal analytics from disparate data sources for real-time dynamic data analytics and/or the like. More particularly, certain example embodiments described herein relate to systems and/or methods for real-time generation of temporal comparative and superlative analytics, in natural language, from real-time and/or historical data sources, for real-time dynamic data analytics and/or the like.

BACKGROUND AND SUMMARY

Some current business intelligence systems generate reports based on predefined questions. Some other business intelligence visualization products asks users to build dashboards by dragging and dropping dimensions, measures, filters, aggregations, and/or the like, e.g., to formulate answers to their questions. Both categories of systems tend to focus on highly-structured data, usually obtainable from databases, data warehouses, and/or other set stores. These systems thus tend to focus on analysis of historical data, as opposed to real-time data.

Modern analytical business users are increasingly interested in more than just standard reporting questions/inquisitive assertions like "show me the sales of each item per quarter." Indeed, modern analytical business users are increasingly interested in asking interactive and complex time-based analytical questions in real-time. But with the advent of Big Data (e.g., a collection of data that is so large and complex that it becomes difficult to process using on-hand data management tools or traditional data processing applications), for example, the data sizes and data velocities (relating to the rate at which data is generated) to be dealt with are growing exponentially. Businesses thus may need to look at more and more data, more and more quickly, to remain competitive.

In this regard, there are many business users whose businesses depend on reactions to real-time data and, thus, business decisions, operations, etc., may be driven in large part by temporal and potentially ever-changing data. One example relates to the growing Internet-of-Things (IoT) industry. The IoT is based on the idea of "everything" being connected, especially when it comes to uniquely identifiable embedded computing like devices within the existing Internet infrastructure. Just as mobile devices are connected, the IoT industry posits that (otherwise) ordinary, everyday consumer products and infrastructure, such as cars, refrigerators, homes, roads, human health sensors, etc., soon will be interconnected. In brief, the IoT is expected to offer advanced connectivity of devices, systems, and services that goes beyond machine-to-machine communications, while covering a variety of protocols, domains, and applications. It will be appreciated that there is a vast number of potential data producers, and that the data produced may be generated quickly and in large amounts, and may change frequently.

Because operational data generally is fast moving, temporal data (also sometimes called streaming data) is different from the historical information from which reports may be more easily generated. Operational data analysts and operational business users oftentimes have "business questions" that are time window based (e.g., with such time windows varying from anywhere from a few seconds, to a few minutes, to a few hours, to a few days or weeks, or even beyond). Such business questions may be "comparative" or "superlative" in nature, and they may be formulated as natural queries or the like.

In this regard, comparative questions may use comparative adverbs such as "faster", "slower", "bigger", "smaller", etc., and oftentimes may be limited to just the top or bottom results (e.g., the top three to ten results). An example comparative question is, "Which online products are selling better than other products in the same category over the last three hours?". In this example, "better" is the comparative part of the question, and the question as a whole may translate to, "Which products have sales in the last three hours that are greater than the average sales of products in the same category?". In this example, "greater than the average sales" is what "better" means.

Superlative analytic style questions oftentimes also are asked. An example superlative question is, "What are the products that have the lowest production line defects per hour in the last 24 hours?". In this example, "lowest" translates to an instruction to "calculate the number of product line defects each hour and show the products with the minimum defects in the hour for the last 24 hours."

Comparative analytics tend to use terms like the ones identified above, which show a change in a measure compared to other elements over or within a period of time. By contrast, superlative analytics oftentimes involves looking for the "best", "worst", "slowest", "fastest", "top", "bottom", or other element(s), and doing so typically translates to calculating the maximum or minimum of a measure or aggregation of a measure, depending on semantics of the question. As an example, "best sales revenue" may translate to maximum sales revenue, and "best production line performance" may translate to minimum number of defects.

Performing analytics unfortunately is quite complicated in practice. In addition to complications in obtaining the answer to a question, it oftentimes is difficult to determine what question is being asked. For instance, transforming comparative and superlative terms like "better" and "best" into concrete queries may require an understanding of complex grammar rules, exact time aggregation and partitioning, knowledge of the context in which the question is being asked, etc. In a related vein, business users oftentimes have an idea about what to ask, but nonetheless are forced to learn about specifically provided query possibilities, programmed capabilities, mechanisms, and the like, and thus must oftentimes concentrate on the "meta-question" of how to formulate a valid question in order to get at the results of interest, as opposed to simply asking the question in the first place.

Adding real-time data to the mix can compound the problem, because there oftentimes is little known about the data until it is actually streaming in, and because there oftentimes is more analytical value to be derived from the real-time data itself than from its structure. Indeed, many business users do not know what they want to see (e.g., what questions should be asked) until the data is actually flowing. For instance, because little may be known about typical values of attributes, how such values are interrelated, what attributes are present and what their types are, etc., it can be quite challenging to even know what questions to start asking. These challenges exist in addition to the fact that such data may be arriving in large amounts and at very high rates.

There are some current search-based and well-structured systems that enable a basic form of question asking and answering. As alluded to above, another state-of-the art approach involves drag-and-drop style analytics systems that leverage well-defined and structured data that is stored in a database style system and is generally historical. Such systems typically require users to have (or to try to develop) expertise in turning a natural language question into an answer by selecting dimensions, measures, filters, aggregations, etc. It is typical for complex questions to be answerable only by pre-constructed queries created by a data analyst or developer.

Yet as will be appreciated from the above, in operational environments, for example, questions oftentimes have a temporal component and are comparative or superlative in nature. To be able to effective ask and answer relevant questions, it would be desirable for systems to understand terms such as, for example, "best", "better", "worst", "worse", "growing", "slowing", etc., as they relate to the data. It also would be beneficial to enable such high-level terminology to be understood, captured, and stored use in subsequent questions and queries, e.g., where real-time data from a plurality of disparate sources is involved.

Unfortunately, however, some current systems generally work on historical and highly-structured database data, oftentimes where structural information and/or information about the data itself must be known in advance. With respect to the latter, some current systems also unfortunately are search oriented (e.g., in that they sometimes require knowledge of column names and/or the like to be able to form a valid search on them) and thus can require a technical understanding of stored data and/or stored data formats. Some other current systems do not generate questions and instead only allow users to ask free-form questions that are limited in nature and do not (for example) support complex temporal, superlative, and comparative analytics.

Certain example embodiments address these and/or other concerns. For instance, certain example embodiments relate to techniques for deriving, and generating, questions and answers on multi-source, real-time and historical data, without requiring a priori knowledge of the data stream and/or the historical data source. Certain example embodiments additionally or alternatively dynamically generate complex temporal business questions and answers, e.g., from real-time and/or historical data, while supporting comparative and superlative questioning. Certain example embodiments thus enable users to analyze real-time data while it is still being generated in addition to, or in place of, merely analyzing historical or static data, without requiring detailed knowledge about the data sources, programming languages, questions to be asked, anticipated answers, etc.

One aspect of certain example embodiments relates to analyzing real-time data to a certain degree in order to automatically identify the data fields and/or enabling a user (e.g., using an interactive GUI frontend) to formulate natural language questions/requests to inspect the real-time data. Certain example embodiments further help to formulate the correct questions and, where the natural language is too vague, a per use case configurable template may be used to more precisely translate the questions, or parts thereof, into a formalized (e.g., mathematical) query (e.g., such as, for example, a SQL or RAQL query).

Another aspect of certain example embodiments relates to the intelligent analysis of parts of real-time and/or other data to help users quickly and easily formulate reasonable queries on the real-time and/or other data, e.g., using configurable building blocks derived from the data itself. Certain example embodiments take the thus-formulated natural language queries and translate them in more formalized queries that are executable on the data. In this regard, certain example embodiments reduce (and sometimes completely eliminate) the need for business users to undertake a meta-inquiry to learn about how questions should be asked in order to yield relevant results, and instead simply provide a templatized or parameterized list of possible and sensible natural language questions.

In certain example embodiments, a method of forming a natural language query template is provided. A sample of real-time events is obtained from a data stream. From the events in the sample, measures and dimensions associated therewith are identified. The identified measures and dimensions are classified as belonging to one or more distinct measures and one or more distinct dimensions, respectively. At least one of the one or more distinct measures and/or at least one of the one or more distinct dimensions are selected for inclusion in the natural language query template, with the natural language query template including natural language expressions and templated fields, and with at least one of the templated fields enabling user selection of one of a comparative and a superlative. The at least one selected distinct measure and/or the at least one selected distinct dimension is/are arranged in the natural language query template as user-selectable options in at least some of the templated fields. The natural language query template with specified user-selectable options is transformable into a formalized query executable on the data stream.

In certain example embodiments, an event processing system is provided. An event channel is configured to receive real-time events from one or more computing systems. A non-transitory computer readable storage medium is provided. Processing resources including at least one processor and a memory configured to control the system to at least: obtain a sample of real-time events from the event channel; identify, from the events in the sample, measures and dimensions associated therewith; classify the identified measures and dimensions as belonging to one or more distinct measures and one or more distinct dimensions, respectively; select at least one of the one or more distinct measures and/or at least one of the one or more distinct dimensions for inclusion in a natural language query template that includes natural language expressions and templated fields, with at least one of the templated fields enabling user selection of one of a comparative and a superlative; arrange the at least one selected distinct measure and/or the at least one selected distinct dimension in the natural language query template as user-selectable options in at least some of the templated fields; responsive to the arranging, store to the non-transitory computer readable storage medium the natural language query template in association with the arranged at least one selected distinct measure and/or the arranged at least one selected distinct dimension; and enable the natural language query template with specified user-selectable options to be transformed into a formalized query executable on the event channel.

Non-transitory computer readable storage mediums tangibly storing instructions for performing the above-summarized and/or other approaches also are provided by certain example embodiments, as well as corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 10 is an annotated question template for an example question that may be generated using the techniques of certain example embodiments.

DETAILED DESCRIPTION

Figure 1:
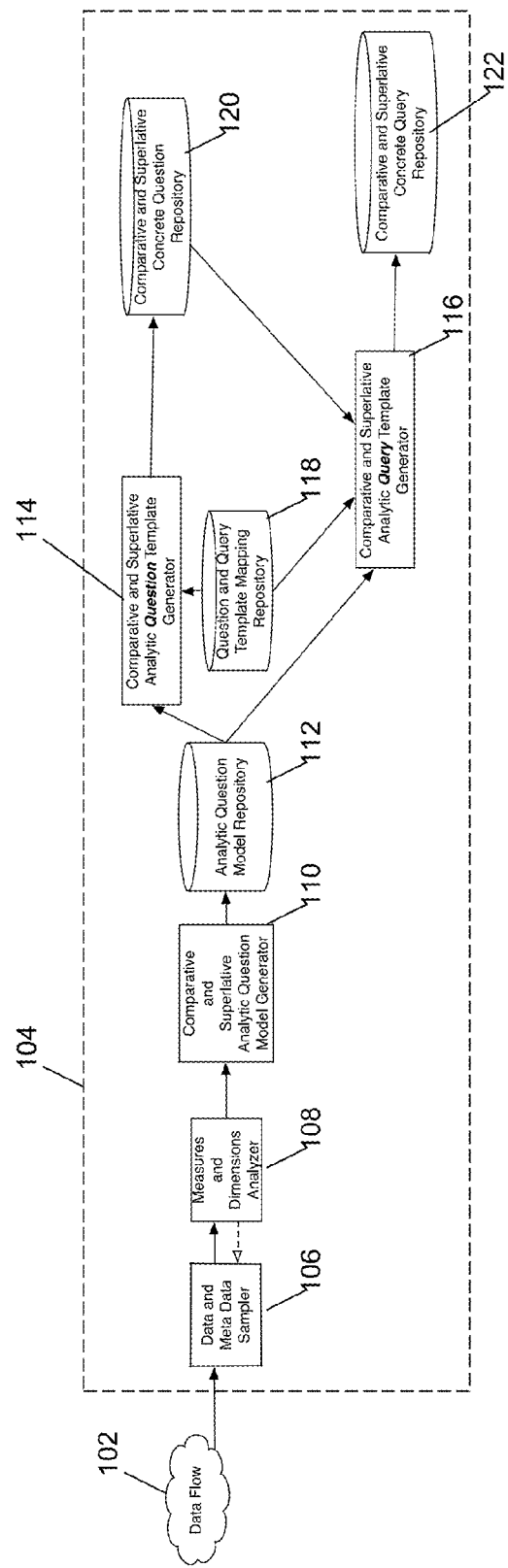
FIG. 1 is a block diagram illustrating components and data flows that may be used in connection with certain example embodiments.

Business users often need to make decisions quickly based on data as events are happening. This can be especially true, for example, for business users in operational areas, who in effect are real-time business users. This type of moving data is often referred to as "data-in-motion", "streaming data", or "real-time data". Such data typically is "continuous" and "ever-changing" (or at least "ever-changeable"). Real-time business users not only could benefit by seeing what is happening as it happens, but they also could benefit from being able to analyze the information to make timely, time-based decisions. Unlike historical or traditional business intelligence systems that have well-defined questions (which may in some instance be phrased in natural language) that are then translated to complex queries and eventually may be used to produce historical reports, real-time business users may need to base their businesses and business decisions on changing events and real-time data. Real-time business users thus oftentimes will not know what questions to ask until they see something happening. Therefore, real-time business users do not always have the ability to spend time formulating questions, converting natural language business questions into complex queries that yield results, etc. Furthermore, they may desire the time between question and answer to be as small as possible to help solve their problems.

In real-time systems, there quite often is a high noise-to-signal ratio. That is, there quite often might be a lot of data (the noise) even though the business user is only interested in certain parts of the data that provide insights and meaning (the signal). Therefore, unlike business intelligence reports that are based on questions posed on a complete data set, real-time business users oftentimes want to look at a smaller set of data that may represent or include the outliers, the best performers, etc.; that may identify rapidly degrading systems, systems that show patterns of a certain performance; things that are trending up or down (e.g., stocks or social media events); etc. In general, there are several commonalities among these types of questions, namely:

- The questions are temporal. That is, the questions look at changes over or within a period of time.
- The questions are comparative. In this sense, the user is not looking for an aggregate of all of the data, but rather is temporally comparing the data (measures, or property on which calculations (e.g., sum, count, average, minimum, maximum, etc.) can be made) against its past performance, against other data's performance, etc.
- The questions look for absolutes. Real-time, temporal data yields the "top", "worst", "fastest", "best", etc., results. These superlative characteristics may signal the most popular Tweet, a reactor that is running too hot, etc. Superlatives can also be so far removed from the average that they may be deemed an outlier, such as an unbelievably well or poorly performing stock, a highly uncharacteristic debit card activity that might indicate fraud, etc.
- The concrete meaning of a comparative or superlative question (for a particular data set) is quite subjective and often can only be put in context by the business user.

As indicated above, existing natural language style business intelligence systems typically rely on well-structured data and are not designed to handle the complexities associated with analyzing streaming data. Instead, they typically are designed to answer natural language (e.g., search style) questions by knowing the dimensions and measures of the system. A dimension in this sense may be thought of as referring to a structure that categorizes facts and measures in order to enable users to answer business questions. Commonly used dimensions are people, products, place, and time.

Certain example embodiments relate to real-time generation of temporal comparative and superlative analytics, in natural language, from real-time and/or historical data sources, for real-time dynamic data analytics and/or the like. Certain example embodiments automatically generate temporal superlative and comparative business questions in natural language form and executable queries in real-time for real-time and/or historical data sources. This may be performed in certain example embodiments by dynamically analyzing one or more selected datasets and examining prior executed queries, data source metadata, data sampling, etc., and even interacting with the user to provide insight into the data in order to formulate the accurate questions. Selected, altered, and extended questions may be captured and stored as metadata for future question and query generation. As will be seen from the description below, certain example embodiments include predefined templates to help precisely define natural language characteristics and make them tangible via a computer program. These templates may be highly configurable and personalizable in some instances.

Certain example embodiments described herein relate to analytics and, for example, time-based analytics, which can be highly dependent on the concept of "time window dimension partitioning." As will be understood by those skilled in the art, time window dimension partitioning divides the data into a set of time windows in which calculations are re-applied for each time window. Although the description that follows focuses on time-based comparative and superlative analytics, it will be appreciated that the techniques set forth herein may be used in connection with any dimension such as location, geography, product, and/or the like, in addition to, or in place of, these time-based aspects.

Comparative analytics help identify business data changes that are relevant to the users whose job it is to compare the performance of products, social media, and in essence anything that can be classified and has a temporal dimension. As indicated above, comparative analytics may be based on comparative adverbs including words such as, for example, "better", "faster", "slower", "greater", "higher", "lower", etc. It also can include terms such as, for example, "easier", "looser", "tighter", "happier", "sadder", etc. Comparative analytics thus can involve, in essence, virtually any measure that can be compared to itself or other measures within and over time. These terms may be considered highly subjective in some cases, and they may be represented internally in a mathematical form using a highly modifiable template, e.g., at least to help formalize some of this subjectivity.

Superlative analytics are time-based analytics that may identify, for example, the "best", "worst", "fastest", "slowest", "easiest", "hardest", or other item(s). Superlative analytics thus can involve, in essence, virtually any measure that can be ranked highest (or lowest) within and over time.

Example Implementation

Referring now more particularly to the drawings, an example implementation will now be provided. FIG. 1 is a block diagram illustrating components and data flows that may be used in connection with certain example embodiments. As shown in FIG. 1, data 102 begins flowing or streaming into the system 104, and the stream of data may be processed by the system 104. The process begins with a "warm-up" mode, which represents the initial flow of data into the system 104. The data and metadata sampler component 106 samples the incoming data, as well as any metadata that has been associated with the data. In general, the flow of data to the data and metadata sampler component 106 may be facilitated by having a listener connected to an event bus, or by having the data and metadata sampler component 106 subscribe to events published on the event bus, e.g., for stream processing.

Stream processing in this sense may follow the pattern of continuous queries, which may be thought of in some instances as being queries that execute for a potentially indefinite amount of time on data that is generated or changes very rapidly. Such data are called streams, and streams oftentimes comprise events. Such streams often exist in real-world scenarios, e.g., as temperature readings from sensors placed in warehouses or on trucks for logistics purposes, weather data, entrance control systems (where events are generated whenever a person enters or leaves, for instance), etc. Events may include attributes (also sometimes referred to as a payload) such as, for example, the value of temperature readings and metadata (sometimes referred to as a header or header data) such as, for example, creation date, validity period, and quality of the event. Some events may have a data portion and temporal information. Possible events occurring in an environment typically are schematically described by so-called event types, which in some respects are somewhat comparable to table definitions in relational databases.

Streams may in certain scenarios be organized in channels that in turn are implemented by an event bus. Channels and event types in this sense may be considered orthogonal concepts, e.g., in the sense that events of the same event type might be communicated via different channels. In some implementations an event bus may be thought of as a central bus for all event streams within an Event-Driven Architecture (EDA). An EDA generally is an architecture that captures the production and consumption of event streams and the reactions to those events. Components within an EDA may be designed to process events in an event-driven manner, e.g., directly when the event arrives. In this regard, in some scenarios, publishers can connect their streams to the bus so that the events are published on it, and subscribers can subscribe to the producer streams made available on the bus.

By processing the incoming events using sophisticated online algorithms, Complex Event Processing (CEP) systems can cope with very high data volumes (e.g., in the range of hundreds of thousands events per second) being processed and analyzed appropriately. CEP in general may be thought of as a processing paradigm that describes the incremental, on-the-fly processing of event streams, typically in connection with continuous queries that are continuously evaluated over event streams. Moreover, CEP analysis techniques may include, for example, the ability to perform continuous queries, identify time-based relations between events by applying windowing (e.g., through XQuery or SQL), etc., with the aid of processing resources such as at least one processor and a memory. See, for example, U.S. Pat. Nos. 8,640,089 and 8,266,351, as well as U.S. Publication Nos. 2014/0078163, 2014/0025700, and 2013/0046725, the entire contents of each of which are hereby incorporated herein by reference.

A CEP system may be used in certain example embodiments, e.g., to receive data 102 from the data feed (or from multiple data feeds) and analyze the received data in an incremental manner with very low (e.g., near-zero) latency. In other words, while the data is streaming in, it may be analyzed on-the-fly, and corresponding analytical results may be forwarded to subsequent consumers, e.g., for the purposes described below. Therefore, a CEP system need not necessarily persist the data it is processing. This is advantageous, because an event stream oftentimes is characterized by high volumes and high rates and therefore cannot be easily persisted.

The data and metadata sampler component 106, potentially using a CEP engine backed by processing resources such as a processor and a memory, identifies the timestamp field and creates a sample with a suitably large sample size. This may be facilitated in certain example embodiments by applying a "sample size soundness test" to determine whether the sample size is of adequate size and contains enough data to identify the appropriate time window partitions, which typically range from as small as a second to as large as days. It will be appreciated that although the appropriate time window (at least theoretically) can be as large as the user wants, because the data is being analyzed in real-time, it is common practice to look at time windows less than a few hours.

Details concerning an example sample size soundness test will now be provided.

Part 1: In this example, the sample data set is represented as S.

Part 2: The initial sample size is 100, and it is represented as: Z=100. At this time, the cardinality of S is Z, and it is represented as |S|=Z.

Part 3: The data and metadata sampler component 106 calculates the distinct timestamps ratio R within sample S using the following formula, which is referred to herein as the data distinctness ratio formula:

$$R = |S \cup S|/|S|$$

One way reading this formula is as follows: The cardinality of the union of S and S (i.e., the cardinality of the union of S with itself) yields the number of distinct timestamps divided by the cardinality of S. This will yield the ratio of unique timestamps, which is R.

Assume, for example, that the following set S of timestamps is provided:

$$S = \{1407533942, 1407537542, 1407537542, 1407541142, 1407541142, 1407620342\}$$

The first two bold timestamps—{1407537542, 1407537542}—are identical, as are the next two bold timestamps—{1407541142, 1407541142}. When applying the union formula S∪S, the result is: {1407533942, 1407537542, 1407541142, 1407620342}. The cardinality of the result of this union is 4. The cardinality of the whole set S is 6. Therefore, substituting the values, the formula takes the following form:

$$R = 4/6 \approx 0.67\text{, which represents a timestamp distinctness of 0.67 or 67\%.}$$

The data and metadata sampler component 106 is programmed to accept an R value of 90% or greater in this example (and it will be appreciated that other values may be used in other examples). If R is under 90%, the data and metadata sampler component 106 will retrieve a new sample of size, such that Z is doubled (although it will be appreciated that other multiplier may be used in other example embodiments). Thus, in this example, if the initial Z value was 100, then the subsequent values are 200, 400, 800, etc. The data and metadata sampler component 106 also keeps track of the changes in R as Z increases. If R has not reached at least 70% in this example, then the data size multiplier (2) will double (to 4). In certain example embodiments, an upward growth may be limited. For instance, if Z>=100,000 and R is at least 75%, the data set may be accepted and the dataset, the timestamp field, and the R and Z values, are passed to the measures and dimensions analyzer 108.

Part 4: The measures and dimensions analyzer 108 analyzes the received information to identify the measures and dimensions, and their data types. In particular, the measures and dimensions analyzer 108 identifies the dimensions and measures that are applicable to comparative and superlative analytics. It reasons as to which measures qualify as "best fit" comparative and superlative measures. Examples of "best fit" measures are measures that contain data that can be calculated and have a high rate of change within time windows (e.g., time windows specifies as being of interest). For instance, if there is a sales data element called named "SLS", the business user need not know for sure that the "sales" number is always a good measure. Instead, the data is sampled and the data distinctness ratio formula (R=|S∪S|/|S|) is applied. Assuming a data set with 100,000 data points and subsequently 100,000 "sales" values that are rational numbers, there is a high likelihood that there will be a small number of sales that are exactly the same, which would in turn yield a high R ratio. Table 1 below shows an example with a high value of R>0.75. In real-time systems, rational data elements with a high R value make for good analytical measures because it may be assumed that business users are always performing calculations and aggregations on their data.

The measures and dimensions analyzer 108 analyzes the data set sent by the data and metadata sampler component 106 for each measure to determine whether the respective measure is a measure that can be added and sent to the comparative and superlative analytic question model generator 110. For instance, the measures and dimensions analyzer 108 may use different heuristic tests for different data types. Table 1 shows example heuristic measure tests that may be used for different data types.

TABLE 1

| Data Type | Examples | Test |
| --- | --- | --- |
| Integer | −1, 0, 2, 100 | Uses the same formula as the data and metadata sampler component 106 - namely, the data distinctness ratio formula (R = \| S ∪ S \|/\|S\|). An acceptable R value is above 30% (but this value could be modified by the user, as indicated above). |
| Rational Number | .90, 10.90, 9.99, 10000.90 | Has a high data distinctness ratio, R > .75 |

The measures and dimensions analyzer 108 also identifies the dimensions of the data. Dimensions are used to partition and aggregate a collection of data measures. Examples of "best fit" dimensions include, for example, time, date, city, state, zip code, area code, ID, product, customer, and company. Timestamps may be used as dimensions in example embodiments. The measures and dimensions analyzer 108 can easily detect times, dates, day name, month name, year, latitude/longitude values, etc., e.g., by testing finite data sets such as day and month names for date-related measures. The same is true with zip codes, states, cities, area codes, religions, political parties, etc. Locations also may be detectable because they too can conform to well-known patterns.

For other data fields, the measures and dimensions analyzer 108 may analyze metadata captured from prior analyses. If none is found, the measures and dimensions analyzer 108 may make an effort to analyze the data to determine if the field is a dimension. It will be appreciated that, while the system is running and has previously generated the analytic business questions, there may be subsequent interactions with the user, e.g., to aid in identifying dimensions not captured, enhancing the questions with previously unidentified dimensions, and/or the like. Once captured, the metadata may be stored for subsequent use by other users. Because the system may be real-time and always running in certain example embodiments, once data is captured, all other users may be provided with access to the metadata utilized by the measures and dimensions analyzer 108.

It will be appreciated that although the measures and dimensions analyzer 108 may receive a data sample set from the data and metadata sampler component 106, which the data and metadata sampler component 106 may deem an appropriate sample size to analyze the timestamps, the measures and dimensions analyzer 108 may request the data and metadata sampler component 106 to provide another sample for a specific measure field that it is analyzing, e.g., of size Z, for a period of time later than from when the initial dataset was sent, for more data for a given measure. This may be desirable, e.g., if the data is still moving and the data and metadata sampler component 106 will be sampling for later time. The measures and dimensions analyzer 108 may continue this process until it satisfies its test (e.g., by determining that an acceptable, user-configurable R-value of the type described above has been achieved, or the like).

As alluded to above, the measures, dimensions, metadata, and data are sent to the comparative and superlative analytic question model generator 110. The comparative and superlative analytic question model generator 110 creates and populates the analytic question model repository 112 with the information it received, metadata, and extra information useful in generating the questions and queries models (e.g., as discussed below).

Figure 2:
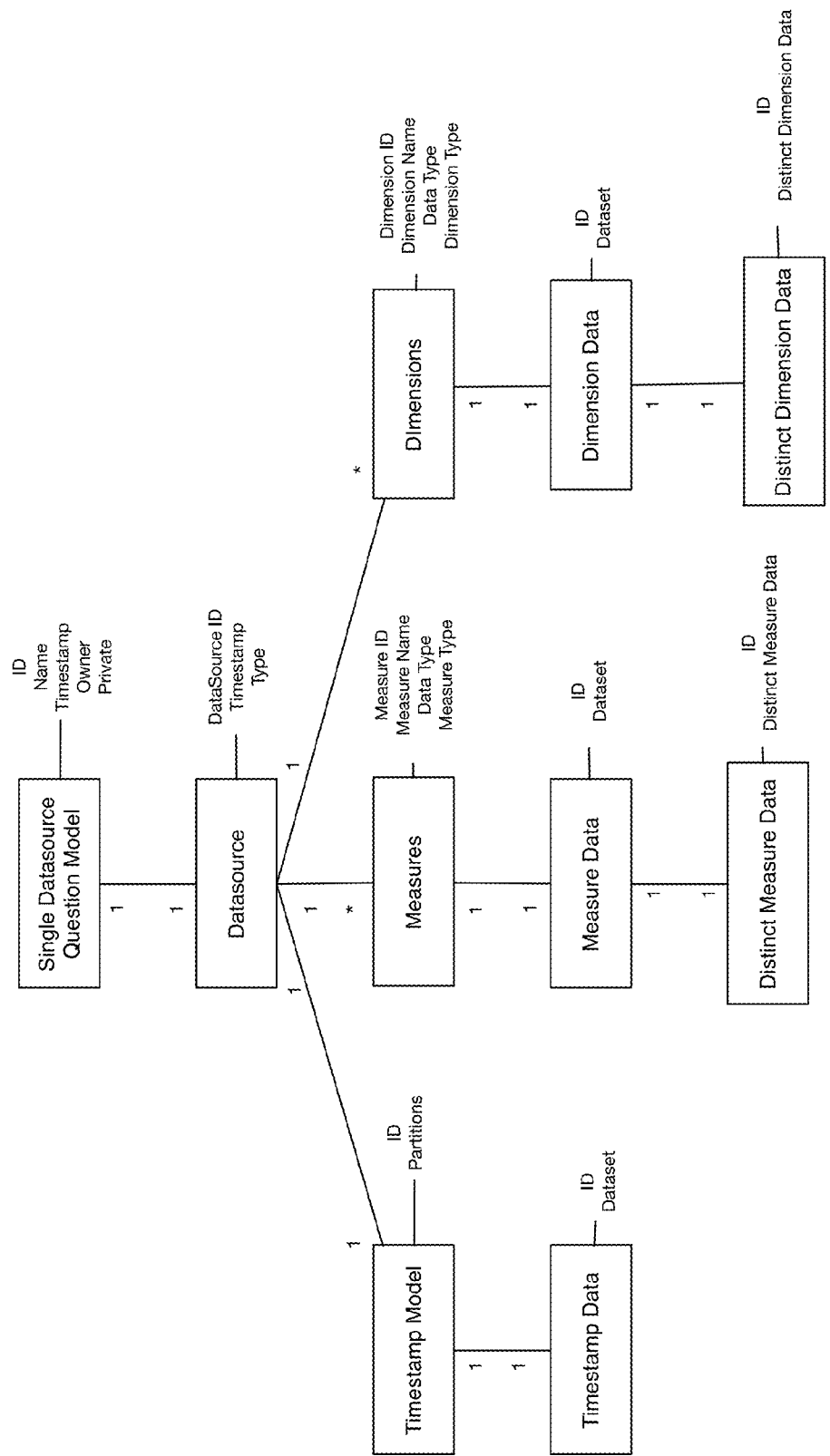
FIG. 2 is a UML diagram showing an analytics single data source model that may be used in connection with certain example embodiments.

FIG. 2 is a UML diagram showing an analytics single data source model that may be used in connection with certain example embodiments. FIG. 2 shows the primary fields that are stored in the analytic question model repository 112 of FIG. 1. Each block in FIG. 2 represents a data element with attributes, and cardinality between elements also is shown. Each model instance is associated with one data source. Each data source, in turn, has one timestamp model, many measures, and many dimensions. The timestamp model includes a unique identifier and a list of the time window partitions that have been identified by the comparative and superlative analytic question model generator 110. Example of types of time-based partitions include, for example, seconds, hours, days, and/or groupings thereof (e.g., ten seconds, three hours, two days, etc.), and/or the like. These partitions are used to generate the appropriate time partitions (dimensions) used to generate the appropriate questions. The timestamp model includes the dataset captured in the comparative and superlative analytic question model generator 110.

Figure 3:
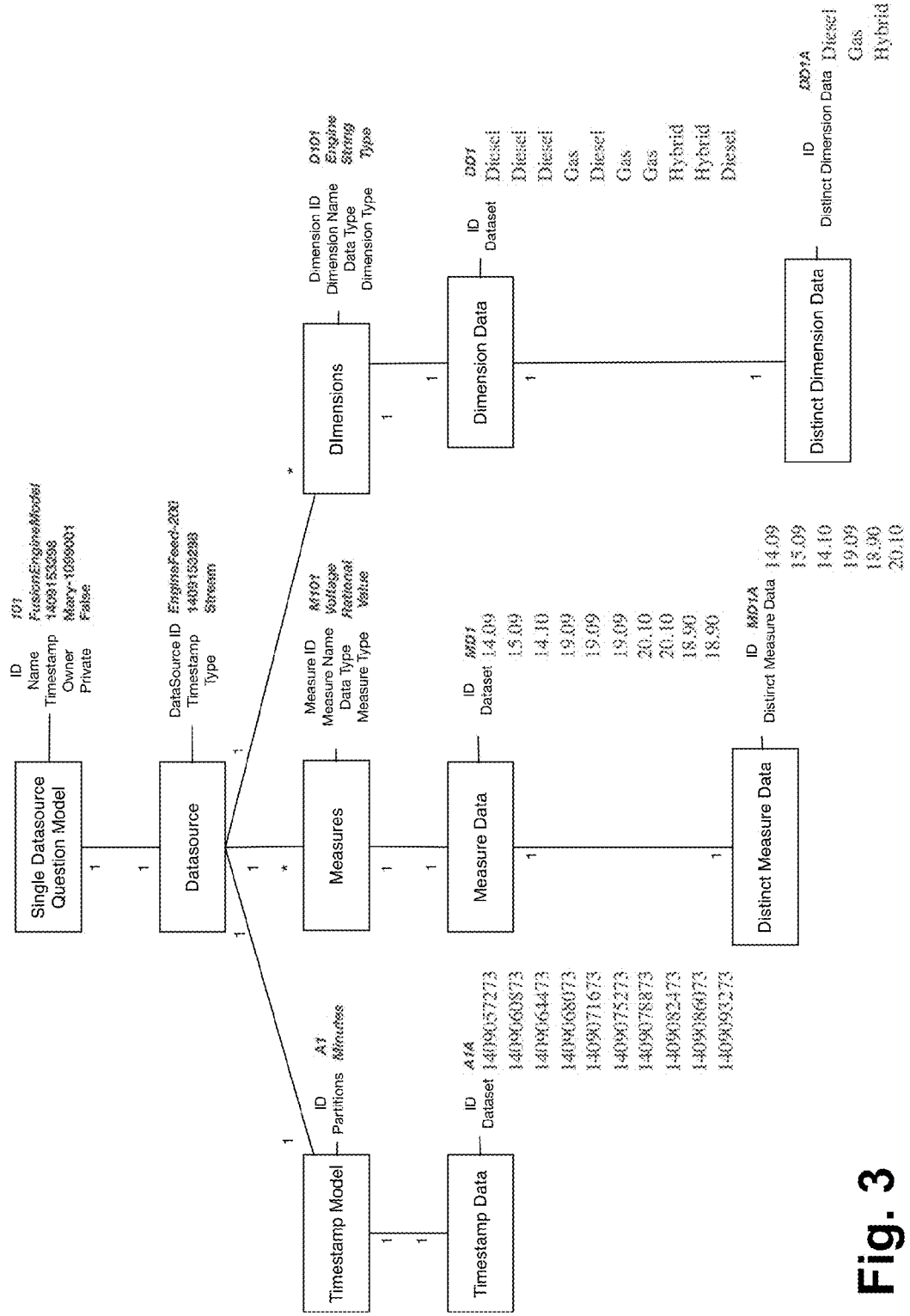
FIG. 3 is an example of how the analytics single data source model of FIG. 2 may be populated.

FIG. 3 is an example of how the analytics single data source model of FIG. 2 may be populated. The identifiers are random or other unique identifiers for each data element set. The top level element (the single data source question model) in the FIG. 3 example is the root of the model, and it has an identifier of 101, is named FusionEngineModel, has a timestamp with the model's creation time, indicates its owner, and has a Boolean value indicating whether the model is private or can be shared. The data source element similarly has an identifier, timestamp, and type (which in this instance indicates that the data source is a stream). As will be appreciated from the above, for this model and this data source, there are three elements, namely, a timestamp model, measures, and dimensions. There is a single instance of the timestamp model, which represents timestamp data and the timestamp partition (which in this example case is expressed in minutes). This implies that the measures and dimensions analyzer 108 determined the "best fit" time partition is "minutes" because the data, on average, arrives every minute.

There are one or more measures and dimensions elements in the FIG. 3 model. Each measures data element includes a measures identifier, a measures name, a data type, and a measure type. The values for this instance are M101, voltage, rational, and value, respectively. In this regard, "rational" identifies that the data type is a rational number, and "value" is indicative of a numeric type. The measures element includes a measures data element with a unique identifier and a sample dataset. In this instance, there are values that range between 14.09 and 20.10. The measures data element has a distinct measures data element, which includes a unique identifier, and a sample of distinct measures data. As will be appreciated from the instant disclosure, distinct measures data may help provide an (at least internal) understanding of how the data is organized, e.g., to facilitate construction of the questions where the user is looking for measures between certain values, in certain ranges, etc., as well as in filtering and/or other operations. For example, if it is inferred from the sampling that the measure data is always greater than $1 million but always less than $5 million, the system might offer questions that identify data elements where the price is greater than $1 million, $2 million, $3 million, $4 million, etc.

In this example, the dimensions element follows the same pattern as the measures elements, in that it too has an identifier, name, data type, and dimension type. As will be appreciated from the above, dimensions are used to group, organize, and categorize the data. In certain example embodiments, dimension types can be "types", "dates", "months", etc. The dimension data element in the FIG. 3 example shows a sample set of engine types which are diesel, gas, and hybrid engine types. The distinct dimension data element shows these distinct values of the sample. Thus, dimension data is the actual data streaming in, whereas distinct dimension data is the unique values from the sample.

The distinct measures and dimensions helps to subsequently offer the user examples of actual data. Although not all of the possible dimensions need to be available for the user to assemble questions in certain example instances, certain example embodiments nonetheless may be configured to add more distinct dimensions, e.g., as data is streaming in and as the model is updated accordingly.

It will be appreciated that the distinct data described above (e.g., the distinct measures data and the distinct dimension data) is unlikely to require a significant amount of storage space. The distinct dimension data is likely to be quite small. For instance, a limited set of distinct dimension data could include product categories, states, male/female, month, etc. As explained herein, certain example embodiments analyze the real-time sample to determine how many distinct values that are found will help in determining whether a given value is a good "dimensional" field. In this regard, if there is a large number of values in a sample (such as is likely to be the case with price), then the candidate is likely to be a measure rather than a dimension and may be treated as such. On the other hand, because real-time data is involved, identifying the timestamp field and ascertaining the rate at which data is streaming in might provide clues that time dimension is (for example) every second, on the order of minutes or hours, etc. Timestamps that indicate that data is incoming every second may suggest that the distinct time dimensions are seconds, minutes, and hours, and timestamps that indicate that data is incoming once an hour may suggest that the distinct dimensions are hours and days. The use of samples of real-time data rather than all of data itself also will keep size down.

The analytic question model repository 112 may be deleted and refreshed at any time. For instance, in certain example embodiments, the analytic question model repository 112 may be considered "always on." Because data sampling happens initially, deletes and refreshes may be performed as additional information is streamed in, when new samples are generated (e.g., at certain predetermined timeframes, when forced by a user, when data is known to be stale, when R values fall below a given threshold, etc.). As will be appreciated by those skilled in the art, because the analytic question model repository 112 includes mostly metadata and distinct data, its size may be kept relatively small and manageable and, thus, refreshes/deletes need not take place frequently in some implementations.

Referring once again to FIG. 1, the comparative and superlative analytic question template generator 114 and the comparative and superlative analytic query template generator 116 are notified that the analytic question model repository 112 is populated (e.g., by the comparative and superlative analytic question model generator 110), and they begin generating questions templates and query templates, respectively. Further detail concerning the creation of these templates is provided below.

In certain example embodiments, the comparative and superlative analytic question template generator 114 and the comparative and superlative analytic query template generator 116 extract comparative and superlative template question mappings stored in the question and query template mapping repository 118. The templates may in certain example embodiments take the form of natural language and templated fields that are populated with dimensions and measures metadata extracted by the components discussed above in connection with FIG. 1. Certain example embodiments use the phrase "Show me" as the beginning of each natural language question, although it will be appreciated that a like phrase (such as, for example "What is") could be used in place of, or in addition to, this construction. It will be appreciated that the semantics in this example may be the same, regardless of what natural language template (i.e., "show me" vs. "what is") is chosen.

The following is an example comparative question template (e.g., a representation of a question in which certain elements are variable and can be changed by the user or system) that is stored in question and query template mapping repository 118 and retrieved by the comparative and superlative analytic query template generator 116:
"Show me the [Limit] [Aggregate Function] [Measure] that are [Comparative]
[in | over] the [Time Window]
in [Distinct Dimension 1, . . . ]
organize by [Dimension 1, . . . ]"
It will be appreciated that this template combines a natural language assertion with elements in brackets that are to be populated with the appropriate data elements stored in the analytic question model repository 112.

The following is an example comparative concrete generated question or generated query based on this template:
"Show me the [3] [Max] [Voltages]
that are [Growing Faster]
[in] the [Last 3 Hours]
in [US, EUROPE]
organize by [Engine Types]"
The question and query template mapping repository 118 includes the mapping metadata that is used by the comparative and superlative analytic question template generator 114 to construct the concrete comparative and superlative questions, which may be stored in the comparative and superlative concrete question repository 120. For each template, the associated mapping exists for the comparative and superlative analytic question template generator 114 to map and generate the appropriate questions.

Figure 4:
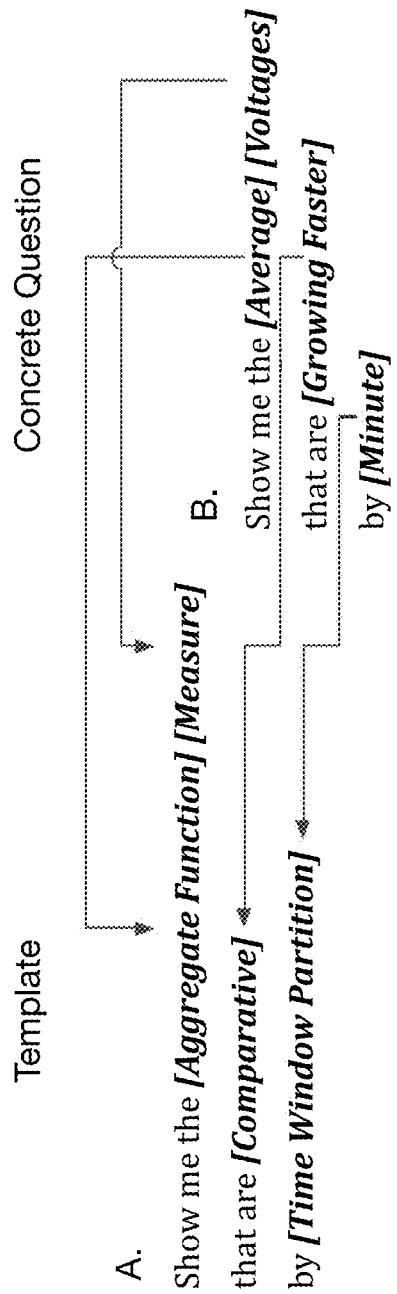
FIG. 4 is a simplified example mapping between a template and a concrete comparative question, in accordance with certain example embodiments.

FIG. 4 is a simplified example mapping between a template and a concrete comparative question, in accordance with certain example embodiments. In the template part at the left of FIG. 4, it can be seen that the template includes the natural language style of all questions beginning with the phrase "Show me the". It is followed by an optional aggregate function, a data measure, the natural language phrase "that are", a comparative statement, the natural language word "by", and a time window partition.

As will be appreciated from the description above, the question and query template mapping repository 118 includes a set of templates and mappings and can be enhanced and extended. The concrete question part us at the right of FIG. 4, and it includes the generated concrete comparative question. FIG. 4 also includes lines linking/mapping the concrete selections at the right back to the parts of the template discussed above in connection with the left part of FIG. 4. In this regard, an average is mapped to the aggregate function from part. "Voltages" is one of many measures that the comparative and superlative analytic question model generator 110 has added to the analytic question model repository 112, e.g., as shown in FIGS. 1 and 3. The phrase "growing faster" is used as the comparative text, and "minute" is selected as the time window partition.

It will be appreciated that each generated question is specific to a single model in the analytic question model repository 112, with the model, in turn, being specific to a single data source. Therefore, the question and query template mapping repository 118 includes mappings from the question templates in the question and query template mapping repository 118 to the specific parts of the model in the comparative and superlative analytic question template generator 114.

Figure 5:
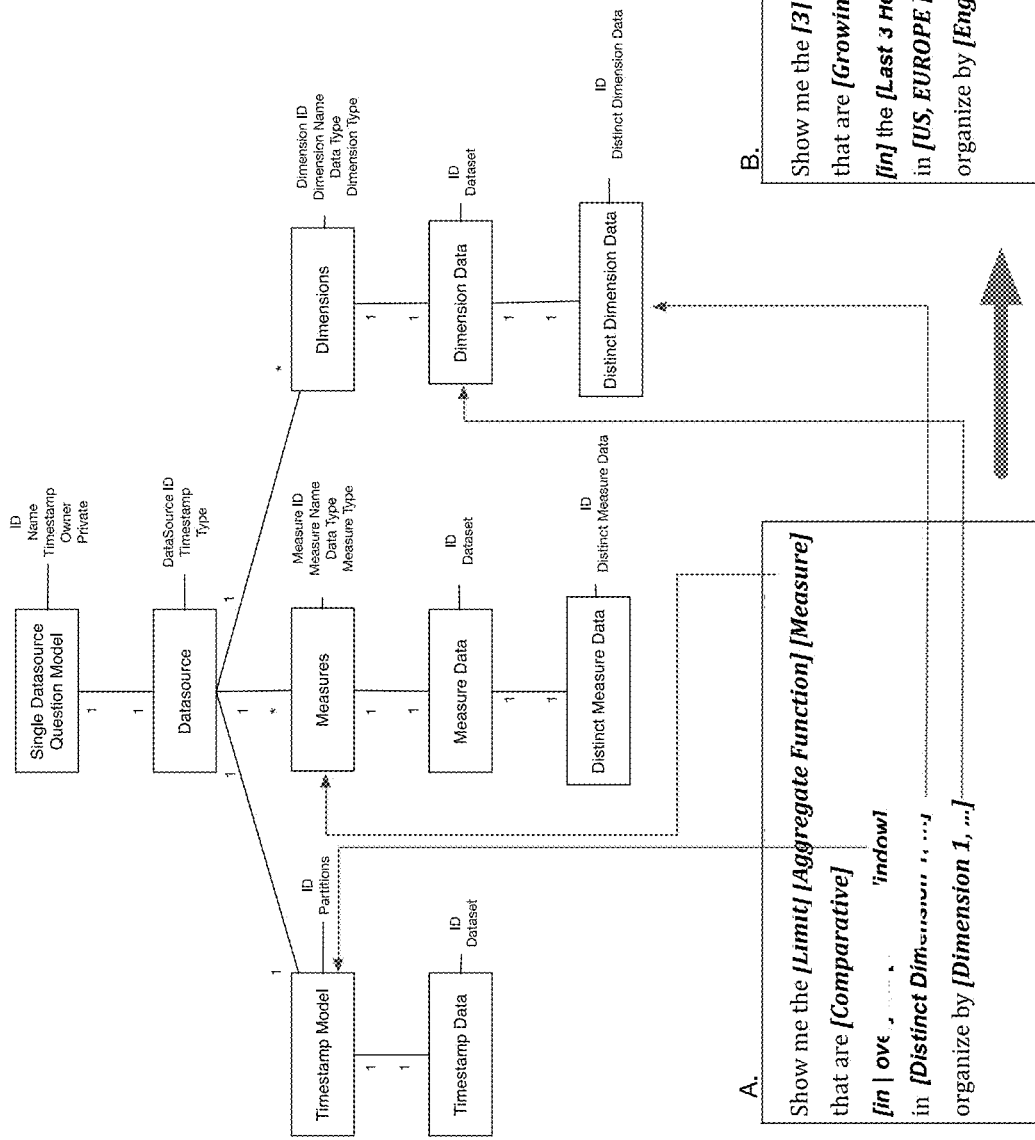
FIG. 5 shows an example analytic question single data source model template to question mapping, in accordance with certain example embodiments.

FIG. 5 shows an example analytic question single data source model template to question mapping, specifically concentrating on the elements of the questions template that are generated using the single data source question model, in accordance with certain example embodiments. The mapping is from an example template similar to the one set forth above to the model of FIG. 2, with the concrete question being posed in the right hand side of FIG. 5. It also will be appreciated that the FIG. 5 example mapping is similar to the mapping shown in FIG. 4, except that a more complex template and concrete question are involved in the FIG. 5 example.

Figure 6:
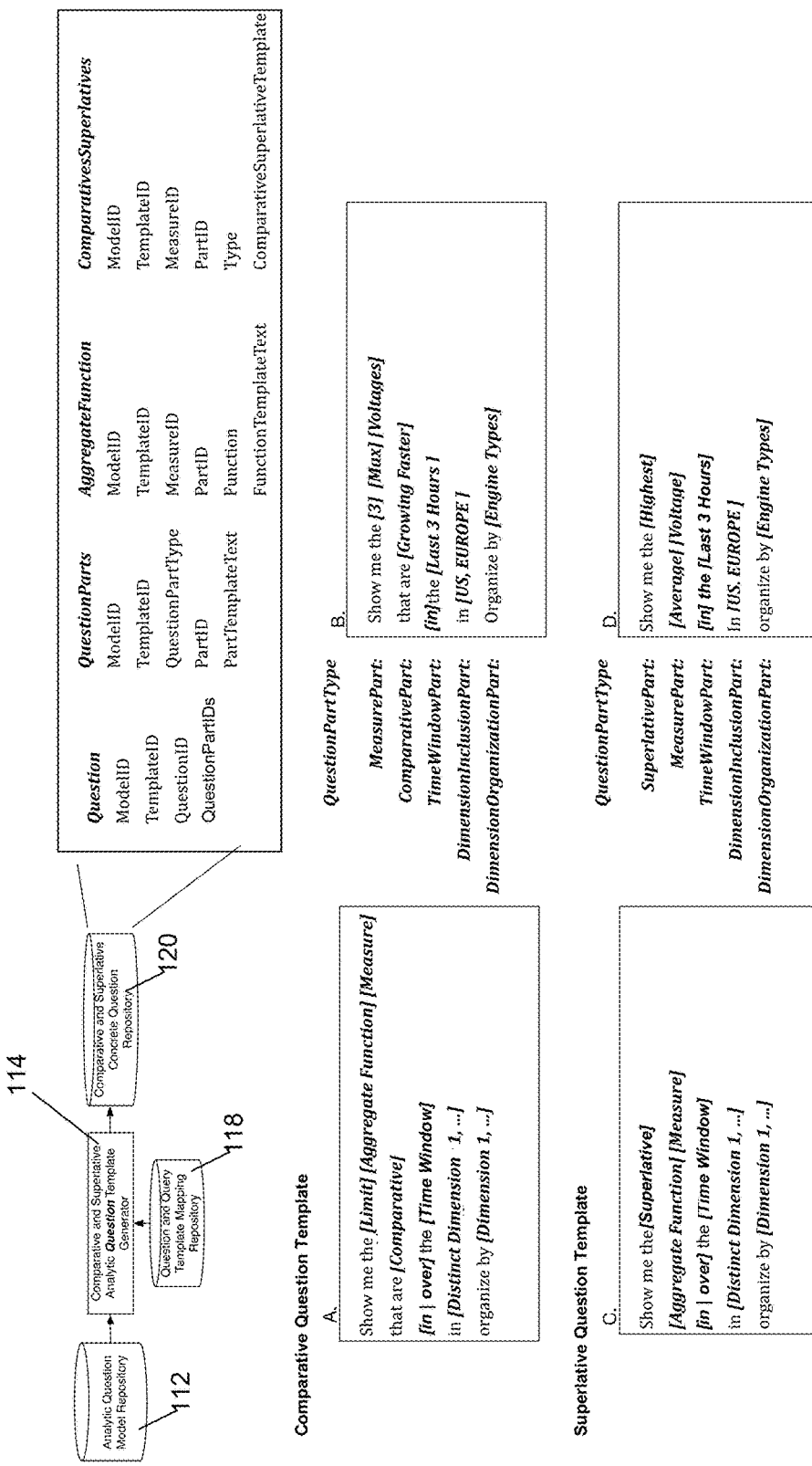
FIG. 6 shows a comparative and superlative question parts process and structure diagram, corresponding to the FIG. 5 example.

Certain example embodiments allow the comparative and superlative analytic question template generator 114 to generate "parts" of the questions and to have such parts assembled at runtime (e.g., in place of, or in addition to, creating a single question for each possible combination). In this regard, FIG. 6 shows a comparative and superlative question parts process and structure diagram, generally corresponding to the FIG. 5 example. The top part of FIG. 6 shows that the comparative and superlative analytic question template generator 114 uses the model from the analytic question model repository 112 and mappings from the question and query template mapping repository 118 to generate concrete questions as parts. The comparative and superlative concrete question repository 120 may include tables or other structures corresponding to questions, question parts, aggregate functions, and comparatives/superlatives. For example, each question may have an associated ModelID (e.g., indicating a corresponding model in the analytic question model repository 112), a TemplateID (e.g., uniquely identifying the question template generated by the comparative and superlative analytic question template generator 114), a QuestionID (e.g., uniquely identifying this specific question), and one or more QuestionPartIDs (e.g., identifying one or more parts of this specific question and which individually link up with the PartID field in the QuestionParts, AggregateFunction, and/or ComparativesSuperlatives column(s) as described in greater detail below). A similar technique may be used for a linkage to a MeasurePart, DimensionInclusionPart, DimensionOrganizationPart, etc.

The question parts may, for example, similarly specify an associated ModelID, TemplateID, and PartID. The QuestionPartType may specify whether this particular building block of the question template is a MeasurePart, ComparativePart or SuperlativePart, TimeWindowPart, Dimension- InclusionPart, and/or the like. PartTemplateText in this example is a template in itself, and it may in some instances allow for elements that are variable and can be set by the user. The PartTemplateText for the MeasurePart in listing B of FIG. 6 includes a user-specifiable limit, followed by an aggregate function followed by a measure. The first field after the natural language text "Show me the" in the MeasurePart, for instance, allows for setting the [Limit] to any number, including 3 (as is shown). As another example, also in the comparative question section, the select user-configurable option refers to the TimeWindowPart, which allows the number of hours to be set by the user (and which is shown in FIG. 6 as being 3 hours).

The comparative question section listing A shows the template parts, and listing B shows the generated parts. In the superlative question section, listing C shows the template parts and listing D shows the generated parts. One difference between the comparative question parts in B and the superlative question parts in D is the ordering between MeasurePart and CompartivePart in B, and SuperlativePart and MeasurePart in D. It will be appreciated that certain example embodiments may enable the dynamic assembly of questions at runtime as including a ComparativePart or a SuperlativePart, but not both.

The comparative and superlative concrete question repository 120 also includes the list of aggregate functions and respective associated FunctionTemplateText. In certain example embodiments, each AggregateFunctionPart is associated with a single model, template, and measure (e.g., as indicated by the identifiers in that column in the upper portion of FIG. 6). Certain example embodiments may start with basic aggregate functions such as count, max, min, average, etc., although it will be appreciated that new aggregate functions and associated function template mappings may be added, e.g., so that the comparative and superlative analytic question template generator 114 can generate new functions and/or new FunctionTemplateText and extend and enhance this more basic set.

Comparatives and superlatives also are included in the comparative and superlative concrete question repository 120. They too have an associated ModelID, TemplateID, and MeasureID, and they also have a PartID. The type field can be either comparative or superlative, and reference may be made to a corresponding template. A list of comparative and superlative words may be maintained in a separate file or repository so that it may be added to often. Final templates may be stored in the repository in certain example embodiments.

It will be appreciated that when QuestionParts are assembled into a concrete question, either at design time or runtime, the question may be stored in the comparative and superlative concrete question repository 120. Each question has a unique QuestionID and a list of the QuestionPartsIDs that make up the completed question.

Table 2 provides examples of superlative and comparative mappings that may exist in the question and query template mapping repository 118 for the comparative and superlative analytic question template generator 114. These mappings may facilitate generation of question parts and query parts by the comparative and superlative analytic question template generator 114 and the comparative and superlative analytic query template generator 116, respectively. As will be appreciated from Table 2, the mappings include information useful in identifying parts required for a question or query, as well as metadata and templates enabling the parts to be assembled into a single question and/or query on-the-fly.

TABLE 2

| Question Type | Language | Type | Fn(s). (F) | Moves | Template |
|---|---|---|---|---|---|
| Super. | Best | Value | Max Min Count | False | F(Measure) |
| Super. | Worst | Value | Max Min Count | False | F(Measure) |
| Super. | Top | Value | Max Min Count | False | F(Measure) |
| Super. | Bottom | Value | Max Min Count | False | F(Measure) |
| Super. | Slowest | Time | | True | Max(Time) over Dimension |
| Super. | Fastest | Time | | True | Min(Time) over Dimension |
| Super. | Newest | Time | | False | Last(TimeStamp) |
| Super. | Oldest | Time | | False | First(TimeStamp) |
| Super. | Most Recent | Time | | False | Last(TimeStamp) |
| Super. | Top Trending | Time | | True | Max(Count(Measure)) in TimeWindow |
| Comp. | Trending | Time | | True | Max(Count(Measure)) in TimeWindow |
| Comp. | Declining | Time | | True | Max(NegDiff (Count(Measure))) over TimeWindow |
| Comp. | Better | Value | Max Min Count | True | F(Measure) over TimeWindow |
| Comp. | Improving | Value | Max Min Count | True | F(Measure) over TimeWindow |

The Question Type field of Table 2 can be either superlative or comparative. The Language field in Table 2 refers to the natural language to be used in the question, and Table 2 specifically contemplates either values or times in this regard. It will be appreciated that the language can be any natural language that depicts what will appear in the question, however. Nonetheless, it might be desirable to conform to grammar rules concerning the use of superlatives and comparatives. That said, grammatical rules are seen by some as being quite complicated and are not fully understood by everyone. For instance, some people form double comparatives (e.g., "more better" and "more quicker"), double superlatives (e.g., "bestest" and "most quickest"), etc. Such double forms are grammatically incorrect, but certain example embodiments may apply algorithms to ascertain or at least attempt to infer their meanings, notwithstanding any more strict conformance to grammar rules that is implemented in connection with the question asking itself. In other words, certain example embodiments may formulate grammatically correct questions, even though users may specify grammatically incorrect ones if otherwise left to use a more free-form definition of such questions.

The Type field in Table 2 identifies whether the question type is based on questions of values or time. If the question is based on a value, then there can be a list of functions that calculate the maximum or minimum values, count the number of instances, etc. Because superlatives such as "best" and "worst" typically are dependent on the data for correct context, the contextual correctness may be captured and stored as metadata. For example, if one is looking for the "best" price of a product, the "lowest" or the minimum value would be contextually correct. If one is looking for the "best" product sales revenue in the past three hours, then "best" instead could refer to the "greatest" summation of the product sales revenue in the last three hours, or the Max (Product Sales Revenue) function.

The Moves field in Table 2 indicates whether the function is to vary over one or more time dimensions, or is set within a fixed time window. If the "moves" value is true, then the questions may, for example, provide for "running" or "moving" identifiers in the question. An example natural language question with such a formulation is: "Show me the Highest Running Opening Price Average Organized by Day in the Year 2013".

In the Template column, "F" denotes the function selected in the Functions column, and "measure" denotes the specific parameter for which the question is being generated, at runtime. For question types where "moves" is true (e.g., such as, for example, questions identifying the "slowest" values), the template can list the exact function (e.g., the "max") applied to a time over a dimension. "Time" in this example denotes the time difference between the beginning and ending time over the dimension. "Dimension" in this example denotes the specific "dimension" for which the question is being generated. "TimeStamp" is the actual timestamp of the data.

For comparative question types, "trending" and "slowing" show that the questions can be "in" or "over" a time window, respectively. The "TimeWindow" represents the amount of time for which a question is being applied, such as "in the last 3 hours" or "over the last two days", and in certain instances may be dependent on the appropriate TimeWindows represented in models from the analytic question model repository 112.

It thus will be appreciated that the Template column in Table 2 is a template grammar that allows the comparative and superlative analytic question template generator 114 to generate the necessary question parts so that a complete question can be assembled.

The following provides an example of a natural language question and a related template:
Natural Language Question:
"Show me the Top Trending Tweet Hashtag in the last 3 hours"
"Top Trending" Template:
Max(Count(Measure)) in TimeWindow
In this example, the superlative is "Top Trending." The template groups each measure and calculates the maximum count of the number of measures, which is "Tweet Hashtags" within the specified time window of the last 3 hours.

However, if the user wants to see which Tweets are slowing down, the user might instead use the following question and associated template:
Natural Language Question:
"Show me the top 10 Tweet Hashtags that are declining over the last three hours."
"Declining" Template:
Max(NegDiff(Count(Measure))) over TimeWindow
In this example, the comparative is "Declining." The template groups each measure and calculates the count of the number of measures, which is "Tweet Hashtags" in the last three hours and the prior three hours. The top (max) 10 Tweets that have the biggest change (NegDiff) from the prior three hours are shown.

A similar approach as that used in processing and structuring question parts (which was described above in connection with FIG. 6) may be used to generate runnable queries for each question. In that regard, referring once again to FIG. 1, the comparative and superlative analytic question template generator 114 populates questions to the comparative and superlative concrete question repository 120, e.g., so that the comparative and superlative analytic query template generator 116 can derive the full query context from the full question. In other words, queries are dependent, at least in part, on the full question. Certain example embodiments thus componentize and categorize each part of a question so that it is possible to easily identify any desired instance within a repository. Indeed, as can be seen from FIG. 6, the question itself may be thought of as a list of references to all other parts therein, whether they be measure parts, comparative parts, time window parts, dimension inclusion parts, dimension organization parts, etc.—and each one of these parts may have its own parts, etc. To facilitate the mapping each part may have its own identifier and a type that collectively stamp it as belonging to a question or the like. Certain example embodiments may also indicate that certain parts of a natural language question and/or query are optional. For instance, time window parts, dimension inclusion parts, dimension organization parts, and/or the like, may be optional. In such cases, it may be possible to execute queries without corresponding values (e.g., if a field is left blank that part of the question may not be added to the query), or a user-supplied or other default value may be applied, etc. Therefore, the comparative and superlative analytic query template generator 116 receives model data from the analytic question model repository 112, mapping data from the question and query template mapping repository 118, and questions from the comparative and superlative concrete question repository 120. It will be appreciated that the queries may be generated in any suitable language such as, for example, SQL, RAQL, and/or the like.

Figure 7:
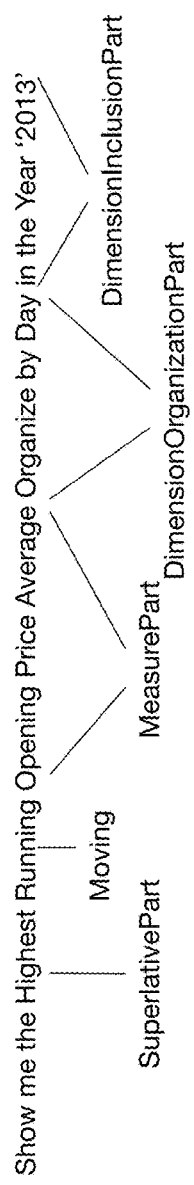
FIG. 7 shows the decomposition of an example question, by parts, in accordance with certain example embodiments.

FIG. 7 shows the decomposition of the question "Show me the Highest Running Opening Price Average Organized by Day in the Year 2013" by parts, in accordance with certain example embodiments. All of these parts make up the question and would be stored in the comparative and superlative concrete question repository 120 as a question with a QuestionID and a list of QuestionParts. The comparative and superlative analytic query template generator 116 will take this information and create the following query:
Select *, max(avg(OpenPrice)) over (partition by extract_day(timestamp) order by timestamp)
where Year in (2013)
from Datasource It will be appreciated that the "Datasource" identifier in this query represents the data source on which the query runs. It will be appreciated that the data source can be any data source, e.g., a database, web service, Excel file, Salesforce output, feed from the Twitter API, etc. That is, the data source may be any real-time or historical data source in certain example embodiments.

Figure 8:
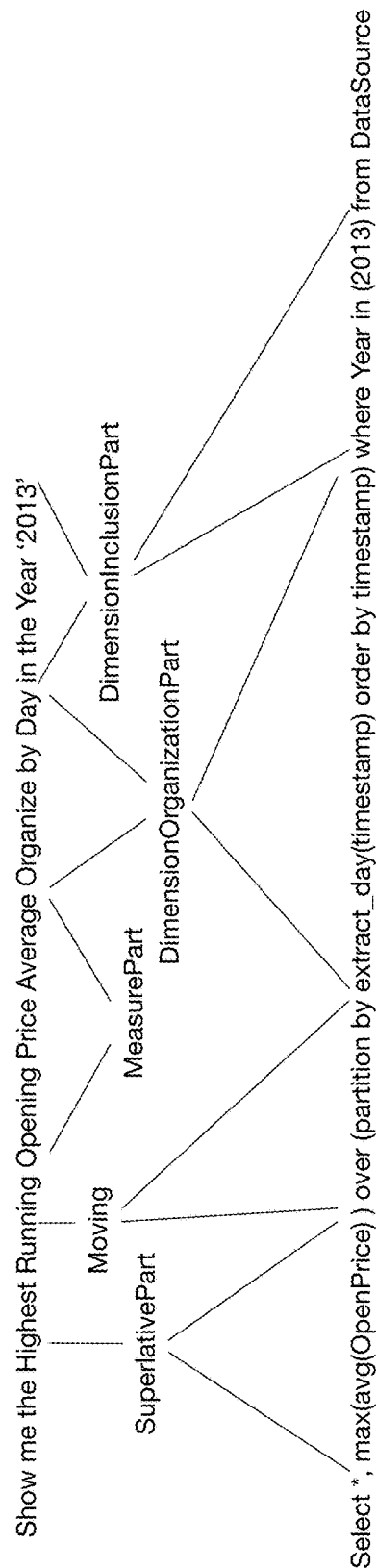
FIG. 8 shows the decomposition of the question parts provided in FIG. 7, in accordance with certain example embodiments.

FIG. 8 builds on the FIG. 7 example and links the natural language query, the parts, and the formalized query. That is, FIG. 8 further shows the decomposition of the question parts provided in FIG. 7 and illustrates how they are understood by the comparative and superlative analytic query template generator 116 and stored in comparative and superlative concrete query repository 122. Once generated and stored, this query can be executed at any time, including design time or runtime (aka "in real-time").

Each of the mappings shown in Table 2 may be associated with a single data source to insure proper context. An example specific user mapping for "really fast trending" comparative analytics is as follows:

TABLE 3

Datasource: Twitter Stream
Natural Language: "Really Fast Trending"
Template Description: Number of Tweets for a Hashtag
grows 80% faster in the last three
hours than the average number of Tweets for
that hashtag over the last week.
Template: Count(Measure) in (last 3 hours) > (.80 * Average
(Count(Measure)) over last 3 hours in last 7 days,
partition by 1 hour)

It will be appreciated that a mapping of this sort may be manually generated by a tool (e.g., a wizard or the like), which "knows" how to create the proper template shown above (i.e., "Count(Measure) in (last 3 hours)>(0.80*Average(Count (Measure)) over last 3 hours in last 7 days, partition by 1 hour))" based on user selections or specification of operators, measures, constants, and/or the like. The user defied mapping may be stored in the question and query template mapping repository 118.

Figure 9:
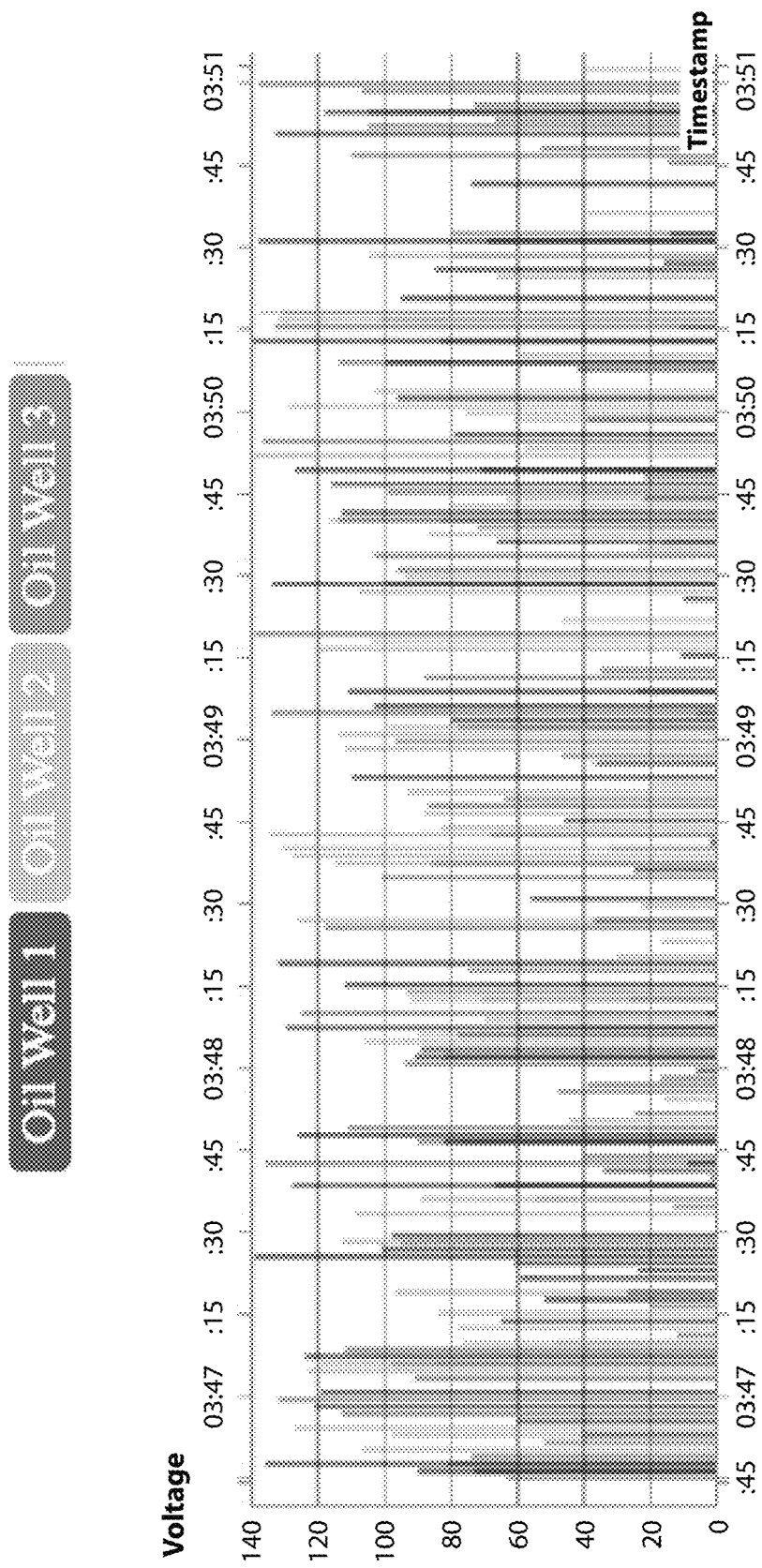
FIG. 9 shows an example real-time visualization of voltage sensor data from three oil wells.

Because the context of the comparative and superlative (e.g., better or best) is at least somewhat vague until concretely mapped to an actual question for a specific data source, certain example embodiments may include a suggestive interaction model. For instance, certain example embodiments may enable the user to select or state variables that provide a more complete context. FIG. 9 shows an example of voltage sensor data from three oil wells. This visualization depicts real-time data, analyzed by certain example embodiments, and visualized in real-time. Such a visualization may be useful in helping to derive context. In other cases, FIG. 9 may be the output from a natural language query.

An end-user may ask a question, initiate a query, etc., by interacting with an application. The application may contact the comparative and superlative concrete question repository 120, from which the application may obtain selectable preformatted questions. These questions may be complete, or they may be models of natural language questions that include fixed and variable parts or fields that are populated with user-selectable parameters as appropriate (e.g., "best", "worst", and/or other parameters for a superlative field; "voltage", "temperature", and/or other parameters for one or more fields with measure; "days", "weeks", and/or other parameters for an organization dimension, time window restriction, measure, or the like; etc.). Having selected a sufficient collection of options to ask a sensible question and/or form a valid query (which may in some cases, but need not necessarily, include making one or more selections for each and every field), the completed (or at least more completed) question or sentence may be passed back to the system shown in FIG. 1, for example, and sent to the comparative and superlative analytic query template generator 116. The specific query (e.g., in SQL, RAQL, or the like) may be created and optionally archived in the comparative and superlative concrete query repository 122. The specific query also may be sent to the invoking application (for example), or to another part of the whole system, for execution.

In this regard, FIG. 10 is an annotated question template for an example question that may be generated using the techniques of certain example embodiments. In this regard, FIG. 10 shows the pre-constructed question parts that are assembled into a complete superlative-type question by the user. In the FIG. 10 example, the user constructs the following question: "Show me the Best Voltage Performance Over the Last 3 Hours". FIG. 10 shows a variety of example user interface elements (e.g., dropdown boxes, dials, checkboxes, etc.) that may be used to specify the optional parameters that may be selected. For instance, a dropdown is provided to enable the user to specify "Worst", "Last", or "Fastest" as a replacement for "Best". These potential replacement selections are not arbitrary and instead represent elements that were defined in the question and query template mapping repository 118 for the specific data source, based on analysis. It will be appreciated that these and/or other user interface elements may be used in different example embodiments.

As shown in FIG. 10, the introductory phrase "Show me the" starts the question. The comparative/superlative "best" is selected (and may be a default in certain example embodiments), but other superlatives (such as, for example, "Worst", "Last", "Fastest", etc.) also are selectable in this example. It will be appreciated that this or a different template may be used for a comparative-type question. Because the semantic meaning of the comparative/superlative depends on the question and data, the user is presented with "directional" terms such as up and down to provide context. In this case, the arrows may be thought of as being represented by the aggregate function of the MeasurePart in FIG. 6C. The measure is derived from the data source analysis. In certain example embodiments, "high scoring" measures, which are measures that show the greatest propensity for selection (e.g., have high R-values of the type described herein), are presented. Based on the template in the question and query template mapping repository 118, the user is presented with options to alter the time partition, time segment, time variable (which is a selectable number in this instance), and the time window (which is optimized based on data time sampling, as explained above).

It will be appreciated that the natural language query, once formed, may be translated into a query in an executable form (e.g., SQL, RAQL, XQuery, etc.) and then executed on the data. The execution of the query may involve a CEP engine in certain example embodiments. In certain example embodiments where a CEP engine is used to help process incoming data, the same CEP engine (or CEP engine instance) may be used to process the natural language query. In other cases, a different CEP engine (or CEP engine instance) may be used to process the natural language query.

As alluded to above, metadata used in the question model may be stored in the analytic question model repository 112. In certain example embodiments, this metadata may be stored separately from the associated data and/or actual computations performed on the data. In certain example embodiments, the associated data and actual computations performed on the data may be stored to a common data store, with the data being only temporarily persisted in certain example embodiments. Any suitable data store may be used including, for example, Software AG's Terracotta Big Memory product. See, for example, U.S. Pat. No. 8,832,674, the entire contents of which are hereby incorporated herein by reference.

As will be appreciated from the above, certain example embodiments do something different than merely taking natural language phrases and turning them into actual executable queries. Instead, certain example embodiments take data and turn it into data-specific natural language questions, and/or question templates with configurable building blocks that once specified correspond to complete questions, that are likely to be asked. Building blocks of the questions may take into account comparative and/or superlative phrasings, e.g., as they are two common question patterns relevant to the analysis of real-time analytical data.

Such approaches are advantageous in certain example instances in that business users usually ask questions rather than construct SQL or other directly executable queries. The example techniques set forth herein can in certain instances help to bridge the gap between users with natural language questions that are temporal and related to their data and users who do not necessarily know what questions to ask on the one hand, and the underlying data and technical understanding needed to get at that data.

It will be appreciated that any suitable query language may be used in connection with different example embodiments. For instance, natural language queries may be translated into SQL queries, RAQL queries, and/or the like in certain example embodiments. In certain example embodiments, the underlying engine is able to execute queries in a language, or in languages, appropriate for the data source(s).

Certain example embodiments have been described in connection with operational systems and data warehouses. Operational systems in some contexts are systems that maintain records of daily business transactions and are contrastable with data warehouses, which in some contexts refer to special-purpose databases that serve as integrated repositories of company data, e.g., for reporting and decision support purpose. That is, in some contexts, operational systems are where data is put in, and the data warehouses are where data is read out. However, it will be appreciated that certain example embodiments may be connected with a variety of different types of data sources (including these operational systems and data warehouses), e.g., over any suitable computer-mediated electronic interface (provided, for example, in connection with an API, network connection, web service, etc.).

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forming a natural language query template, the method comprising:
    obtaining a sample of real-time events from a data stream;
    identifying, from data in the events in the sample, using processing resources including at least one hardware processor, measures and dimensions associated with that data;
    classifying, using the processing resources, the identified measures and dimensions as belonging to one or more distinct measures and one or more distinct dimensions, respectively;
    selecting at least one of the one or more distinct measures and/or at least one of the one or more distinct dimensions for inclusion in the natural language query template, the selecting being performed by the processing resources automatically, the natural language query template including natural language expressions and templated fields, at least one of the templated fields enabling user selection of one of a comparative and a superlative; and
    building, using the processing resources, the natural language query template by arranging the at least one selected distinct measure and/or the at least one selected distinct dimension in the natural language query template as user-selectable options in at least some of the templated fields;
    wherein a natural language query is buildable from the natural language query template and specified user-selectable options, and wherein the natural language query, in turn, is transformable into a formalized query executable on the data stream.

2. The method of claim 1, wherein:
    the identifying further identifies timestamps associated with the events in the sample; and
    the classifying further identifies one or more timeframes relevant to the events in the sample based on the identified timestamps.

3. The method of claim 2, wherein the one or more timeframes include one or more time windows in or over which the formalized query is to be run, the one or more time windows being included as respective user-selectable options in one or more of the templated fields.

4. The method of claim 1, wherein the selecting identifies measures that have a high rate of change within a predefined time window of interest.

5. The method of claim 1, wherein the selecting identifies those measures whose number of unique values divided by the total number of events in the sample that include that respective measure exceed a predetermined threshold.

6. The method of claim 5, wherein the predetermined threshold varies based on the data type of the values.

7. The method of claim 5, wherein values that are within a predetermined distance of one another are treated as being non-unique.

8. The method of claim 1, wherein the selecting identifies dimensions by testing for conformance with well-known patterns for commonly tested dimensions.

9. The method of claim 1, wherein the natural language query template is built in connection with at least one question part that has an associated mapping, the mapping specifying for its associated question part:
    whether the associated question part is one of a comparative or superlative type question part,
    what natural language text is to be included in the associated question part,
    whether the associated question part is allowed to vary over time, and
    an indication as to what function(s) is/are to be performed on a value associated with the associated question part.

10. The method of claim 9, wherein each said mapping further specifies for its associated question part a type of variable to be used with the associated question part, variable types for the question parts being one of time-based and value-based variable types.

11. The method of claim 9, wherein additional functions are user-definable.

12. A method of forming a natural language query template, the method comprising:
obtaining a sample of real-time events from a data stream;
identifying, from the events in the sample, using processing resources including at least one hardware processor, measures and dimensions associated therewith;
classifying, using the processing resources, the identified measures and dimensions as belonging to one or more distinct measures and one or more distinct dimensions, respectively;
selecting, using the processing resources, at least one of the one or more distinct measures and/or at least one of the one or more distinct dimensions for inclusion in the natural language query template, the natural language query template including natural language expressions and templated fields, at least one of the templated fields enabling user selection of one of a comparative and a superlative; and
arranging, using the processing resources, the at least one selected distinct measure and/or the at least one selected distinct dimension in the natural language query template as user-selectable options in at least some of the templated fields;
wherein the natural language query template with specified user-selectable options is transformable into a formalized query executable on the data stream; and
wherein the obtaining of the sample comprises:
(a) obtaining an initial sample having a predetermined sample size, each said real-time event in the initial sample having an associated timestamp;
(b) identifying all unique timestamps in the initial sample;
(c) determining whether the number of unique timestamps in the initial sample size divided by the number of real-time events in the initial sample meets or exceeds a predetermined threshold value;
(d) in response to a determination that the number of unique timestamps in the initial sample size divided by the number of real-time events in the initial sample meets or exceeds the predetermined threshold value, treating the initial sample as the sample; and
(e) in response to a determination that the number of unique timestamps in the initial sample size divided by the number of real-time events in the initial sample does not meet or exceed the predetermined threshold value, increasing the predetermined sample size and repeating (a)-(e), as needed.

13. The method of claim 12, wherein each increase of the predetermined sample size doubles the then-current predetermined sample size.

14. The method of claim 12, wherein each increase of the predetermined sample size increases the then-current predetermined sample size in a predefined manner, unless the then-current predetermined sample size exceeds a second threshold value lower than the predetermined threshold value and the then-current predetermined sample size exceeds a preset threshold amount, in which case the sample is considered complete.

15. The method of claim 12, wherein (b) treats timestamps within a given proximity to one another as being non-unique.

16. An event processing system, comprising:
an event channel configured to receive real-time events from one or more computing systems;
a non-transitory computer readable storage medium; and
processing resources including at least one processor and a memory configured to control the system to at least:
obtain a sample of real-time events from the event channel;
identify, from data in the events in the sample, measures and dimensions associated with that data;
classify the identified measures and dimensions as belonging to one or more distinct measures and one or more distinct dimensions, respectively;
select at least one of the one or more distinct measures and/or at least one of the one or more distinct dimensions for inclusion in a natural language query template that includes natural language expressions and templated fields, at least one of the templated fields enabling user selection of one of a comparative and a superlative;
arrange the at least one selected distinct measure and/or the at least one selected distinct dimension in the natural language query template as user-selectable options in at least some of the templated fields;
responsive to the arranging, store to the non-transitory computer readable storage medium the natural language query template in association with the arranged at least one selected distinct measure and/or the arranged at least one selected distinct dimension; and
enable the natural language query template with specified user-selectable options to be transformed into a formalized query executable on the event channel.

17. The system of claim 16, wherein the processing resources are further configured to control the system to store the formalized query to the non-transitory computer readable storage medium.

18. The system of claim 16, further comprising a complex event processing (CEP) engine configured to executed the formalized query.

19. The system of claim 16, wherein:
the identifying further identifies timestamps associated with the events in the sample; and
the classifying further identifies one or more timeframes relevant to the events in the sample based on the identified timestamps.

20. The system of claim 16, wherein the obtaining of the sample comprises:
(a) obtaining an initial sample having a predetermined sample size, each said real-time event in the initial sample having an associated timestamp;
(b) identifying all sufficiently unique timestamps in the initial sample;
(c) determining whether the number of sufficiently unique timestamps in the initial sample size divided by the number of real-time events in the initial sample meets or exceeds a predetermined threshold value;
(d) in response to a determination that the number of sufficiently unique timestamps in the initial sample size divided by the number of real-time events in the initial sample meets or exceeds the predetermined threshold value, treating the initial sample as the sample; and
(e) in response to a determination that the number of sufficiently unique timestamps in the initial sample size divided by the number of real-time events in the initial sample does not meet or exceed the predetermined threshold value, increasing the predetermined sample size and repeating (a)-(e), as needed.

21. The system of claim 16, wherein the selecting identifies measures that have a high rate of change within a predefined time window of interest.

22. The system of claim 16, wherein the selecting identifies dimensions by testing for conformance with well-known patterns for commonly tested dimensions.

23. The system of claim 16, wherein the natural language query template is built in connection with at least one question part that has an associated mapping, the mapping specifying for its associated question part:
whether the associated question part is one of a comparative or superlative type question part,
what natural language text is to be included in the associated question part,
whether the associated question part is allowed to vary over time, and
an indication as to what function(s) is/are to be performed on a value associated with the associated question part.

24. The system of claim 23, wherein each said mapping further specifies for its associated question part a type of variable to be used with the associated question part, variable types for the question parts being one of time-based and value-based variable types.

25. A non-transitory computer readable storage medium having a program for forming a natural language query template stored thereon, the program comprising instructions that, when executed, cause a computing system including at least one processor and a memory to at least:
obtain a sample of real-time events from a data stream;
identify, from the events in the sample, measures and dimensions associated therewith;
classify the identified measures and dimensions as belonging to one or more distinct measures and one or more distinct dimensions, respectively;
automatically select at least one of the one or more distinct measures and/or at least one of the one or more distinct dimensions for inclusion in the natural language query template, the at least one selected distinct measure and/or the at least one selected distinct dimension being selected dynamically based on the classification and having a propensity for subsequent user selection that is higher than non-selected distinct measure(s) and/or non-selected distinct dimension(s), the natural language query template including natural language expressions and templated fields, at least one of the templated fields enabling user selection of one of a comparative and a superlative; and
arrange the at least one selected distinct measure and/or the at least one selected distinct dimension in the natural language query template as user-selectable options in at least some of the templated fields;
wherein the natural language query template with specified user-selectable options is transformable into a formalized query executable on the data stream.

* * * * *